United States Patent

[11] 3,571,678

| [72] | Inventors | Muneyoshi Sezako;<br>Isao Nagayasu; Haruo Sato, Tokyo, Japan |
|---|---|---|
| [21] | Appl. No. | 756,953 |
| [22] | Filed | Sept. 3, 1968 |
| [45] | Patented | Mar. 23, 1971 |
| [73] | Assignee | Watanabe Instruments Corp.<br>Tokyo, Japan |
| [32] | Priority | Sept. 4, 1967 |
| [33] | | Japan |
| [31] | | 42/75304 |

[54] ELECTROSTATIC RECORDING PAPER HOLDING DEVICE
11 Claims, 3 Drawing Figs.

[52] U.S. Cl. .................................................... 317/262
[51] Int. Cl. ....................................................... H05
[50] Field of Search ........................................ 317/262,
262 (ESF)

[56] References Cited
UNITED STATES PATENTS

| 3,359,469 | 12/1967 | Levy et al. .................. | 317/262 |
| 3,448,356 | 6/1969 | Testone ....................... | 317/262 |

*Primary Examiner*—Lee T. Hix
*Attorney*—Otto John Munz

ABSTRACT: An electrostatic recording paper holding device adapted to be employed in connection with a recording instrument and comprising as its base a flexible insulating resin sheet or film having on one side a metallic layer vapor-deposited or in adhesion which forms one electrode and on the other side a semiconductor layer coated thereon which supports a conductive pattern provided with a plurality of openings therein which in turn supports a metallic frame at portion thereof, and an electric circuit connected to said metallic layer and conductive pattern and including a switch and DC power source.

PATENTED MAR 23 1971 3,571,678
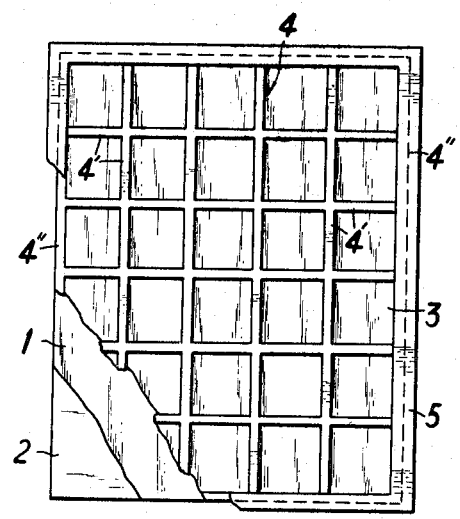
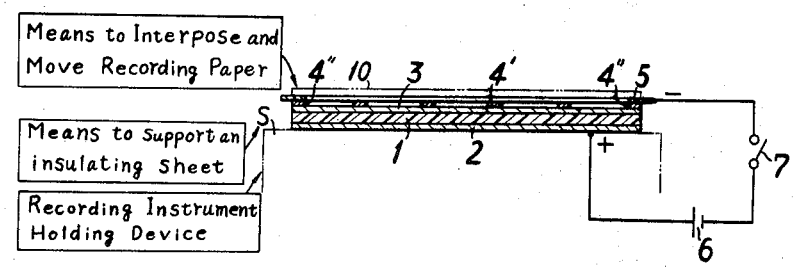
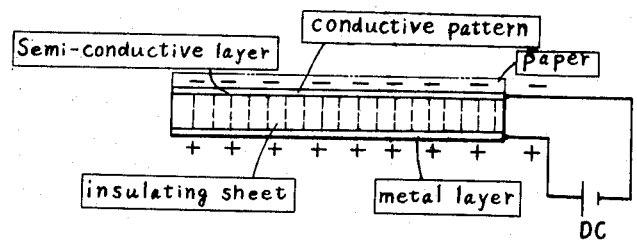
INVENTOR.
MUNEYOSHI SEZAKO, HARUO SATO, ISAO NAGAYASU
BY
ATTORNEY

ELECTROSTATIC RECORDING PAPER HOLDING DEVICE

BACKGROUND OF THE INVENTION

As a recording paper holding device to be employed in connection with an X-Y recorder, the so-called electrostatic holding device has been proposed. The electrostatic recording paper holding device comprises a plurality of laterally spaced barlike conductors embedded in the insulating resin support structure for recording paper of the X-Y recorder and alternate conductors of them are electrically connected to one another so as to form two groups of electrodes having different polarities. In such a electrostatic recording paper holding device DC potential of 500—1,500 V is applied across the two groups of electrodes having different polarities so as to indirectly apply an electrostatic potential upon a recording paper placed on the support structure whereby the recording paper may be held by electrostatic in a desired position on the support structure of the X-Y recorder in an electrostatic inductive manner.

However, in the above-mentioned prior art electrostatic recording paper holding device, the plurality of barlike conductors, the alternate ones of which form the two groups of electrodes having different polarities, have to be embedded in the recording paper support structure of the recorder in an electrically insulated relation to one another and accordingly, the construction of such an electrostatic holding device would be inevitable complicated and requires a rather complicated procedure in the fabrication thereof. Furthermore, the recording paper support structure of any existing recorder can not be provided with such an electrostatic holding device without substantial remodelling or change on the construction. And when the recording paper is moved after the release of the attractive force which holds the paper in position to the following a new portion thereof to a desired position on the support structure, the support structure has an electric charge thereon due to the friction between the support structure and the recording paper. Thus often impedes the attractive holding action of the paper and results in failure of holding of the paper in the desired position on the support structure.

SUMMARY OF THE INVENTION

The present invention relates to an improved electrostatic recording paper holding device to be employed in connection with X-Y recorders, thermometers, hygrometers and the like recording instruments and more particularly, to an improved electrostatic recording paper holding device adapted to firmly hold a recording paper on an existing support structure of any of the above-mentioned instruments by means of electrostatic attraction force.

One object of the present invention is to provide an electrostatic recording paper holding device which can be easily mounted on the existing support structure of any of various conventional recording instruments without remodelling or change and which is simpler in construction and less expensive to manufacture.

Another object of the present invention is to provide an electrostatic recording paper holding device which comprises as its base a very thin flexible sheet or film and accordingly, may be easily mounted on the support structure having any shape uniformly curved surface or as a flat surface, without difficulties.

Another object of the present invention is to provide an electrostatic recording paper holding device having an excellent attractive holding capability and adapted to be mounted on the support structure of a conventional recording instrument which comprises as the base body, a flexible thin sheet or film having a semiconductor layer the surface of which supports a conductive pattern whereby when a recording paper is placed on the flexible sheet in contact with the conductive pattern, to every unit area of the paper can be applied the same polarity and value of potential thereon and the paper is held in position on the support structure by electrostatic attraction.

A further object of the present invention is to provide an electrostatic recording paper holding device adapted to be mounted on the existing support structure of any conventional recording instrument without in which when a recording paper is moved on the support structure and accordingly, on the holding device, an electric charge which may be generated between the recording paper and the support elements therefor due to the friction can be discharged therefrom in a brief period of time.

According to the present invention, the electrostatic recording paper holding device generally comprises as its base a flexible insulating sheet or film formed of synthetic resin such as vinyl chloride and polystyrene and having on one side or surface a metallic layer vapor-deposited or adhered thereto which forms one electrode and on the other side or surface a semiconductor layer coated thereon which has the specific resistance of $10^{10}$—$10^{13}$ ohm-cm which is sufficient to discharge quickly any electric charge which may be generated between the recording paper and the semiconductor layer and associated support elements due to friction as the paper is moved on the semiconductor layer and support elements in a frictional contact with them. The semiconductor layer supports thereon a conductive pattern in a netlike formation comprising spaced stripes intersecting at right angles so as to form spaces each having the area of 1—2 $cm^2$ therebetween and an edge stripe extending along the entire peripheral edge of the pattern and intersecting the intersecting stripes at their opposite ends. Alternatively, the conductive pattern may comprise only stripes extending in unidirectional and an edge stripe interconnecting the one direction stripes at their opposite ends. The conductive pattern forms the other electrode having the opposite polarity to that formed by the metallic layer and a metallic conductive frame is superimposed on the edge stripe of the conductive pattern so that a potential is applied thereon from a suitable DC power source through the conductive frame pattern and semiconductive layer. The above-mentioned electrostatic recording paper holding device is mounted on the existing recording paper support structure of any conventional recorder with the metallic layer adhering to the upper surface of the support structure. The recording paper holding device further comprises an electric circuit including a DC power source of 500—1,500 V and a normally open switch and having one end electrically connected to the conductive frame and the other end electrically connected to the semiconductor layer. In the illustrated embodiment the metallic layer serves as the anode while the conductive pattern serves as the cathode. After the mounting of the holding device on the support structure, a recording paper is placed on the device. When the switch is closed to energize the circuit the DC power source applies DC voltage across the metallic layer and conductive pattern whereby to every unit of the recording paper which is in contact with the pattern is applied an equal value of potential having the same polarity as that of the pattern. The negative potential and the paper are firmly held in position on the support structure by the attractive action of the positive metallic layer on the lower side of the flexible sheet or film. Therefore, the novel electrostatic recording paper holding device is advantageous because of its positive attractive holding capability over the above-mentioned prior art indirect electrostatic holding device which comprises two groups of electrodes of different polarities embedded in the support structure of a X-Y recorder.

Furthermore, according to the present invention, since the electrostatic recording paper holding device comprises as its base a flexible resin insulating sheet or film having on one side or surface (which is the lower side when the holding device is mounted on the support structure) a metallic layer forming one electrode and on the other side or surface (which is the upper side when the holding device is mounted on the support structure) a semiconductor layer which supports thereon a conductive pattern which forms the other electrode having the opposite polarity from that of the electrode formed by the metallic layer, the novel holding device is simpler in construction and less expensive as compared with the corresponding prior art recording paper holding devices. Furthermore, since the novel electrostatic recording paper holding device can be fabricated to have a very thin thickness, the holding device can be easily mounted on the existing support structure of a conventional recording instrument regardless of whether the support structure has a curved surface or a flat surface. In addition, in the electrostatic holding device according to the present invention, any electric charge generated due to the friction between the recording paper and the support elements of the holding device as the recording paper moved on the holding device, can be discharged in a brief period of time through the semiconductor layer, conductive pattern and frame whereby the attractive holding action of the holding device may not be impeded by the electric charge.

The above and other objects and advantages of the present invention will be more readily apparent to those skilled in the art from a reading of the following description in connection with the accompanying drawing.

BRIEF DESCRIPTION OF THE DRAWINGS

FIG. 1 is a plan view of a preferred form of electrostatic recording paper holding device constructed in accordance with the present invention with several elements thereof shown for purposes of brevity entirely of partially broken away;

FIG. 2 is a vertical sectional view of said holding device of FIG. 1 showing the device as being mounted on the support structure of a recording instrument; and FIG. 3 is a schematic view of the circuit diagram of FIG. 2 showing the operation of the device.

PREFERRED EMBODIMENT OF THE INVENTION

The present invention will be now described referring to the accompanying drawing in which a preferred form of electrostatic recording paper holding device in accordance with the present invention is shown for illustration only, but not to limit the scope of the invention. The novel electrostatic recording paper holding device generally comprises as its base a flexible insulating film or sheet 1 which is formed of vinyl chloride, polystyrene or the like and which is shown as being mounted on the existing supporting structure S of a conventional recording instrument (FIG. 2) by any suitable adhesive. The insulating film 1 has a thin metallic layer 2 on one or the lower side which is adhesively supported on the supporting structure S and the other side of the metallic layer is applied to the film side by vapor deposit, adhesive or the like medium. As will become hereinafter, the metallic layer 2 forms one electrode (the anode). The other or upper side of the insulating film 1 has a semiconductor layer 3 coated thereon and the semiconductor layer has the specific resistance on the order of $10^{10}$-$10^{13}$ ohm-cm so that even when an electric charge is applied on the semiconductor layer as a recording paper is moved on the holding device in frictional contact with the semiconductor layer, such a charge may be discharged as will be discussed in detail hereinafter. The semiconductive layer is formed by coating an antistatic material on one side of the insulating base sheet which is sold under the trade name "CATANAC" SN by the A.C.C. in the United States of America for example. The top surface of the semiconductor layer 3 supports a conductive pattern 4 which in the illustrated embodiment is in a netlike formation having intersecting stripes 4' arranged at right angles so as to define a plurality of spaces therebetween each having the area 1—2 cm². The conductive pattern 4 serves to form the other electrode (the cathode). The pattern 4 may be alternatively formed of stripes extending only in one direction which are laterally spaced from each other by the distance of 1—2 cm. The opposite ends of the pattern forming stripes are integrally connected to a rectangular peripheral edge stripe 4" extending along the entire peripheral edge on the top surface of the semiconductor layer 3 and formed of the same conductive material as that of the pattern stripes 4'. The pattern 4 may be easily formed by printing the stripes 4' and 4" of any conventional conductive paint on the top surface of the semiconductor layer 3 or by adhering metallic foil or sheet metal on the semiconductor layer surface by any suitable adhesive. When the conductive pattern 4 is formed by printing the stripes 4' and 4" of a conductive paint having a relatively high resistance value, a rectangular edge frame 5 of metallic foil or sheet metal is preferably superposed on the peripheral edge stripe 4" so that every unit portion of the conductive pattern 4 may be applied on equal value of voltage thereto. In such a case, the conductive frame 5 is preferably connected to a DC voltage source and a desired voltage is applied through the frame 5 to the conductive pattern 4.

FIG. 2 illustrates the novel recording paper holding device in its operative position and in which the flexible insulating film or sheet 1 is fixedly supported on the recording paper support structure S of a recording instrument with the metallic layer 2 adhered to or vapor-deposited on the surface of the supporting structure S so as to form the anode. A sheet of recording paper 10 is disposed on the semiconductor layer 3 and accordingly, also on the conductive pattern 4 which forms the cathode and superposed frame 5. When a switch 7 is closed so as to establish a circuit including a DC power source 6 having the capacity of 500—1,500 V and the switch 7 and at one terminal end leading to the conductive pattern 4 and the frame 5 and at the other terminal end to the metallic layer 5, a DC voltage of 500—1,500 V is applied across the metallic layer 2 and conductive pattern 4 whereby the entire lower side of the recording paper 10 which has a certain degree of humidity is caused to contact the semiconductor layer 3, conductive pattern 4 and frame 5 to render the paper to be the cathode. The thus polarized recording paper 10 is evenly attracted toward the metallic layer 2 or the anode on the lower side of the insulating film or sheet 1 and firmly held in position on the film or sheet 1 and accordingly, on the support structure S. When the switch 7 is opened while the recording paper 10 is being held in position in this way so as to break the circuit and accordingly, to discontinue the application of the DC voltage to the conductive pattern 4 and frame 5, the force which is attracting the recording paper 10 toward the metallic layer 2 is extinguished and the paper may be easily released from the insulating film or sheet 1. Furthermore, the semiconductor layer 3 of the insulating film 1 also serves to rapidly discharge any frictional charge which may be generated therein due to friction as the paper 10 is moved from the holding device in frictional contact with the semiconductor layer 3, conductive pattern 4 and frame 5. Thus, it will be understood that the novel recording paper holding device can effectively prevent the recording paper attracting action from being impeded by the above-mentioned frictional charge which would be inevitable in any conventional recording paper holding device in which a recording paper is indirectly applied electrostatic charge thereto.

FIG. 3 shows how the recording paper 10 when positioned upon the conductive patter 4 in intimate contact with it, becomes a negative electrode and will be electrostatically attracted to the positive electrode by linear electric forces, demonstrated by the parallel lines to the metal layer, when a relatively low D.C. voltage is applied. The recording paper, having a high electrical resistance, functions at this moment as a conductor and the conductive pattern assumes the function of an electric terminal, inducing negative voltage. Because the recording paper is in contact with the semiconductor layer through the openings in the latter a discharge of electrostatic attraction by a per chance hand contact of the operator is avoided.

While one specific embodiment of the present invention has been shown and described in detail, it will be understood that the same is for illustration only and is not to be taken as a definition of the scope of the invention, reference being had for this purpose to the appended claims.

We claim:

1. An electrostatic recording paper holding device adapted to be mounted on the support structure of a recording instrument, said holding device comprising:

a means to support fixedly an insulating sheet;
a flexible insulating sheet having on one side adjacent said means to support an anode means;
on the opposite side of said anode means a cathode means comprising:
  a semiconductor layer having a specific resistance sufficient to discharge an electric charge in a brief period of times,
  means to interpose a recording paper upon and in frictional contact with said semiconductive layer as the said paper is moved on said holding device over the said semiconductor layer,
  said semiconductor layer supporting thereon a conductive pattern with a plurality of openings therein so as to expose portions of the semiconductive layer to said recording paper, and
  and a DC power supply circuit including a DC power source and a switch for energizing said circuit, said several means being so arranged relative to each other that when said circuit is energized a DC voltage is applied across the said anode and the said cathode and the said cathode to form parallel lines of electric forces across them, the said conductive pattern functioning as an electrical terminal, and the said recording paper, having a high electric resistance value, itself functioning as the negative electrode attracted to the said anode.

2. An electrostatic recording paper holding device as set forth in claim 1, said anode means being a metallic layer on the said insulating sheet in adhesion with the surface of said means to support; said semiconductor layer and said conductive pattern cooperating with said means to support to keep said recording paper thereon whereby when a DC voltage is applied across the metallic layer and the conductive pattern a potential is applied to said semiconductive layer having the same polarity as that of the pattern, but opposite to that of the metallic layer.

3. An electrostatic recording paper holding device as set forth in claim 1, in which said insulating sheet is formed of synthetic resins.

4. An electrostatic recording paper holding device as set forth in claim 1, in which said metallic layer is vapor-deposited of on said insulating sheet.

5. An electrostatic recording paper holding device as set forth in claim 1, in which said semiconductive layer is coated on the side of said insulating sheet opposite to said means to support and has the specific resistance of $10^{10}$—$10^{13}$ and said conductive pattern is formed by coated stripes intersecting at right angles and peripheral edge stripe interconnecting said intersecting stripes at their opposite ends in a netlike formation so as to form spaces each having an area of 1—2 cm2 therebetween.

6. An electrostatic recording paper holding device as set forth in claim 1, in which said conductive pattern is formed by printing stripes of conductive paint on the free surface of said semiconductive layer.

7. An electrostatic recording paper holding device as set forth in claim 1, in which said conductive pattern is formed by strips of metallic adhering to the free surface of said semiconductive layer.

8. An electrostatic recording paper holding device as set forth in claim 1, in which a conductive frame is superimposed on said peripheral edge stripe of the conductive pattern and a DC voltage is applied on the conductive pattern through said conductive frame.

9. An electrostatic recording paper holding device as claimed in claim 1, said plurality of openings in said conductive pattern being formed with coated stripes equidistantly spaced from each other a distance of between about 1 to 2 cm.

10. An electrostatic recording paper holding device as claimed in claim 1, said anode comprising a metallic layer in adhesion with said insulating sheet.

11. An electrostatic recording paper holding device as claimed in claim 1, said semiconductive layer being coated on said sheet to exhibit a specific resistance of $10^{10}$ to $10^{13}$ ohm.